US008041947B2

(12) United States Patent
O'Brien et al.

(10) Patent No.: US 8,041,947 B2
(45) Date of Patent: *Oct. 18, 2011

(54) COMPUTER ARCHITECTURE FOR AN ELECTRONIC DEVICE PROVIDING SLS ACCESS TO MLS FILE SYSTEM WITH TRUSTED LOADING AND PROTECTION OF PROGRAM EXECUTION MEMORY

(75) Inventors: Terence W. O'Brien, Webster, NY (US); Richard Schmalbach, Timonium, MD (US); John Blessing, Eldersburg, MD (US); Jeffrey Murray, Penfield, NY (US)

(73) Assignee: Harris Corporation, Melbourne, FL (US)

( * ) Notice: Subject to any disclaimer, the term of this patent is extended or adjusted under 35 U.S.C. 154(b) by 930 days.

This patent is subject to a terminal disclaimer.

(21) Appl. No.: 11/387,744

(22) Filed: Mar. 23, 2006

(65) Prior Publication Data

US 2007/0226493 A1 Sep. 27, 2007

(51) Int. Cl.
*H04L 29/00* (2006.01)

(52) U.S. Cl. ........................................ 713/166; 713/165

(58) Field of Classification Search .................... 713/166
See application file for complete search history.

(56) References Cited

U.S. PATENT DOCUMENTS

| 4,227,253 | A | * | 10/1980 | Ehrsam et al. | ............... | 380/45 |
| 4,493,031 | A | | 1/1985 | Silverio | | |
| 4,918,728 | A | | 4/1990 | Matyas et al. | | |
| 5,263,168 | A | * | 11/1993 | Toms et al. | .................. | 713/1 |
| 5,283,828 | A | * | 2/1994 | Saunders et al. | ............ | 713/192 |
| 5,369,702 | A | | 11/1994 | Shanton | | |
| 5,548,646 | A | | 8/1996 | Aziz et al. | | |

(Continued)

FOREIGN PATENT DOCUMENTS

DE 196 33 919 6/1997

(Continued)

OTHER PUBLICATIONS

WIKI: "Multilevel Security" Wikipedia, [online] Retrieved from the Internet: URL://http://en.wikipedia.org/w/index.php?title=Multi-level_security&oldid=44733265> [retrieved on Aug. 9, 2007].

(Continued)

*Primary Examiner* — Nasser Moazzami
*Assistant Examiner* — Ghazal Shehni
(74) *Attorney, Agent, or Firm* — Fox Rothschild, LLP; Robert J. Sacco

(57) ABSTRACT

System for providing a secure file service includes an MLS file service module (300) comprised of a cryptographic processor (302). The MLS file service module also includes an MLS file system (301) hosted by the cryptographic processor. A secure user processor (402) includes programming and communications hardware for requesting at least one classified file from the MLS file service module. The cryptographic processor includes cryptographic hardware and software to decrypt the classified file. The cryptographic processor is also performs an integrity check on the classified file. Once the file is decrypted and its integrity checked by the cryptographic processor, the MLS file service module serves the classified file to the secure user processor in decrypted form. If the classified file is an executable file, the method also includes selectively enabling a write function for program memory of the secure user processor. This write function is disabled immediately after the classified executable file has been loaded into the program memory to guard against self modifying programs.

29 Claims, 6 Drawing Sheets

U.S. PATENT DOCUMENTS

| | | | |
|---|---|---|---|
| 5,596,718 A * | 1/1997 | Boebert et al. | 726/16 |
| 5,748,744 A | 5/1998 | Levy et al. | |
| 5,802,178 A | 9/1998 | Holden et al. | |
| 5,887,064 A | 3/1999 | Seysen | |
| 5,956,404 A | 9/1999 | Schneier et al. | |
| 6,081,895 A | 6/2000 | Harrison et al. | |
| 6,092,202 A | 7/2000 | Veil et al. | |
| 6,148,401 A * | 11/2000 | Devanbu et al. | 713/170 |
| 6,282,653 B1 | 8/2001 | Berstis et al. | |
| 6,351,817 B1 | 2/2002 | Flyntz | |
| 6,378,071 B1 | 4/2002 | Sasaki et al. | |
| 6,378,072 B1 * | 4/2002 | Collins et al. | 713/187 |
| 6,671,804 B1 | 12/2003 | Kent | |
| 6,775,778 B1 | 8/2004 | Laczko, Sr. et al. | |
| 7,003,674 B1 | 2/2006 | Hamlin | |
| 7,028,149 B2 | 4/2006 | Grawrock et al. | |
| 7,047,405 B2 | 5/2006 | Mauro | |
| 7,069,447 B1 * | 6/2006 | Corder | 713/189 |
| 7,072,937 B2 | 7/2006 | Neebe et al. | |
| 7,290,288 B2 | 10/2007 | Gregg et al. | |
| 7,302,698 B1 * | 11/2007 | Proudler et al. | 726/2 |
| 7,322,042 B2 * | 1/2008 | Srinivasan et al. | 726/17 |
| 7,380,275 B2 * | 5/2008 | Srinivasan et al. | 726/17 |
| 7,392,398 B1 * | 6/2008 | Shakkarwar | 713/189 |
| 7,543,144 B2 | 6/2009 | Rensin et al. | |
| 7,698,552 B2 | 4/2010 | Wilson et al. | |
| 7,765,399 B2 | 7/2010 | O'Brien | |
| 7,779,252 B2 | 8/2010 | O'Brien et al. | |
| 7,818,574 B2 | 10/2010 | Fayad et al. | |
| 2001/0044886 A1 | 11/2001 | Cassagnol et al. | |
| 2002/0059238 A1 | 5/2002 | Saito | |
| 2002/0099950 A1 | 7/2002 | Smith | |
| 2003/0126434 A1 | 7/2003 | Lim et al. | |
| 2003/0163740 A1 | 8/2003 | Thjai et al. | |
| 2003/0204801 A1 | 10/2003 | Tkacik et al. | |
| 2004/0039924 A1 | 2/2004 | Baldwin et al. | |
| 2004/0044902 A1 | 3/2004 | Luthi | |
| 2004/0103288 A1 | 5/2004 | Ziv et al. | |
| 2005/0055524 A1 | 3/2005 | Gulick et al. | |
| 2005/0114687 A1 | 5/2005 | Zimmer et al. | |
| 2005/0132186 A1 | 6/2005 | Khan et al. | |
| 2006/0021007 A1 | 1/2006 | Rensin et al. | |
| 2006/0041755 A1 | 2/2006 | Pemmaraju | |
| 2006/0078109 A1 | 4/2006 | Akashika et al. | |
| 2006/0105740 A1 | 5/2006 | Puranik | |
| 2006/0195907 A1 | 8/2006 | Delfs et al. | |
| 2006/0248599 A1 | 11/2006 | Sack et al. | |
| 2006/0251258 A1 | 11/2006 | Lillie et al. | |
| 2006/0253711 A1 | 11/2006 | Kallmann | |
| 2007/0214364 A1 | 9/2007 | Roberts | |
| 2007/0226494 A1 | 9/2007 | O'Brien et al. | |
| 2007/0226517 A1 | 9/2007 | O'Brien et al. | |
| 2007/0250411 A1 | 10/2007 | Williams | |
| 2007/0283159 A1 | 12/2007 | Borsa et al. | |
| 2008/0022136 A1 | 1/2008 | Mattsson et al. | |
| 2009/0150899 A1 | 6/2009 | Tahan | |

FOREIGN PATENT DOCUMENTS

| | | |
|---|---|---|
| EP | 0 471 538 | 2/1992 |
| EP | 0 657 820 | 6/1995 |
| EP | 1085396 | 3/2001 |
| GB | 2336005 A | 10/1999 |
| WO | WO-9839876 | 9/1998 |

OTHER PUBLICATIONS

Schneier, Applied Cryptography Second Edition, 1996, John Wiley & Sons, Second Edition, pp. 513-514.

Extended European Search Report mailed Jul. 13, 2011; Application Serial No. 11003076.4 - 2212 in the name of Harris Corporation.

Meadows C Ed—Institute of Electrical and Electronics Engineers: "Extending the Brewer-Nash model to a multilevel context", Proceedings of the Symposium on Research in Security and Privacy. Oakland, May 7-9, 1990; [Proceedings of the Symposium on Research in Security and Privacy],Los Alamitos, IEEE Comp. Soc. Press, US, vol. SYMP. 11, May 7, 1990, pp. 95-102, XP010020190, DOI: DOI:10.1109/RISP.1990.63842 ISBN: 978-0-8186-2060-7.

Brewer D F C et al: "The Chinese Wall security policy", Proceedings of the Symposium on Security and Privacy. Oakland, May 1-3, 1989; [Proceedings of the Symposium on Security and Privacy], Washington, IEEE Comp. Soc. Press, US, vol.-, May 1, 1989, pp. 206-214, XP010016022, DOI: D0I:10.1109/SECPRI.1989.36295 ISBN: 978-0-8186-19397.

Fraser T: "LOMAC: Low Water-Mark integrity protection for COTS environments", Security and Privacy, 2000. S&P2000. Proceedings. 2000 IEEE Symposium on Berkeley, CA, USA May 14-17 2000, Los Alamitos, CA, USA,IEEE Comput. Soc, US, May 14, 2000, pp. 230-245, XP010501138, DOI:D0I:10.1109/SECPRI.2000.848460 ISBN: 978-0-7695-0665-4.

Information about Related Patents and Patent Applications, see section 6 of the accompanying Information Disclosure Statement Letter, which concerns Related Patents and Patent Applications.

* cited by examiner

COMPUTER ARCHITECTURE FOR AN ELECTRONIC DEVICE PROVIDING SLS ACCESS TO MLS FILE SYSTEM WITH TRUSTED LOADING AND PROTECTION OF PROGRAM EXECUTION MEMORY

BACKGROUND OF THE INVENTION

1. Statement of the Technical Field

The inventive arrangements relate to electronic devices for storing and accessing sensitive/classified data.

2. Description of the Related Art

Electronic computers have the ability to store and process data. Computers typically include some kind of microprocessor with a commercially available operating system such as Linux, Unix, or Microsoft Windows. Many computers also have displays and keyboards for the human/machine interface. The foregoing capabilities make these devices highly useful for a various business and personal applications.

Currently, there exist a wide variety of computing devices with conventional operating systems and architectures. These commercially available computers with commercial-off-the-shelf (COTS) operating systems and COTS application programs generally satisfy the processing and data storage requirements of most users. For example, they include applications for word processing, data storage, spreadsheets, time management, and contact management. These applications generally function quite well and have interfaces that are familiar to many users.

Some commercially available computing devices and/or software applications incorporate various security measures in an effort to protect data which is stored or processed using the device. For example, encryption technology and password protection features are known in the art. Still, this level of security can be inadequate for managing information that is of a Confidential, Secret, or Top Secret nature, particularly when such information relates to matters of national security. For example, COTS operating systems and applications may not be sufficiently trustworthy for handling this type of information. Such programs can be susceptible to being compromised by various means including hacker attacks, viruses, worms, Trojan horses, and a wide variety of other means that are known to those skilled in the art.

Finally, notwithstanding the security limitations of COTS operating systems and applications, the basic architecture and interface systems of many commercial computing devices may leave these devices vulnerable to intrusion. For example, COTS devices do not employ trusted microprocessors, do not employ physical separation of classified and unclassified data processing, nor do they employ physical tamper detection and subsequent memory zeroization. Consequently, transport or processing of classified data using a commercial computer is not generally permitted.

Trusted operating systems and applications are generally designed to more rigorously address the problem of computer security. Trusted operating systems undergo evaluation of their overall design, verification of the integrity and reliability of their source code, and systematic, independent penetration evaluation. In contrast, non-trusted operating systems are generally not designed to an equally high level with regard to security precautions.

Single-level secure (SLS) is a class of systems that contain information with a single sensitivity (classification). SLS systems permit access by a user to data at a single sensitivity level without compromising data. Thus, SLS data file systems allow information at a single classification to be stored in an information system. The level of access can be limited by the current user security classification sign-on level and a security classification assigned to the secure user processor.

Multi-level secure (MLS) is a class of systems that contain information with different sensitivities (classifications). MLS systems permit simultaneous access by a user to data at multiple classification levels without compromising security. Thus, MLS data file systems allow information with different classifications to be stored in an information system. These systems are also designed to provide a user with the ability to process information in the same system. Significantly, however, these systems prevent a user from accessing information for which he is not cleared, does not have proper authorization, or does not have a need-to-know.

Users of non-trusted COTS operating systems, as may be found in commercial computers, are not generally allowed access to classified data found in secure file systems. Computers that utilize a trusted operating system (OS) which includes support for an SLS or MLS file system have been developed that are specifically designed to allow for storage of classified data. However, these devices are not generally designed to physically secure the data and zeroize the data upon tamper detection. Nor are they designed to be embedded as a secure component of a host computer system.

SUMMARY OF THE INVENTION

The invention concerns a method for providing a single-level secure user processor with multi-level secure (MLS) file system services. The method begins by authenticating a user to a cryptographic processor by communicating one or more types of user authentication information to the cryptographic processor. Based on such authentication, the MLS file system services are provided such that the secure user processor has access to files at only one defined security classification level at a time.

According to one aspect of the invention, a user can initiate a request for a classified file at a secure human machine interface (HMI). The secure HMI can communicate the request to a secure user processor, which forwards the request to an MLS file service module. In response to the request, a cryptographic processor associated with the MLS file service module accesses an MLS file system containing the classified file. Thereafter the cryptographic processor decrypts the classified file and performs an integrity check on the contents. The classified file is then served to the secure user processor in decrypted form, but only if its integrity has been verified. If the classified file is an executable file, the method also includes selectively enabling a write function for program memory of the secure user processor responsive to the integrity checking step. This write function is disabled immediately after the classified executable file has been loaded into the program memory to guard against self modifying programs.

The term "cryptographic processor" as used herein generally refers to a computer processing device that is specifically designed to facilitate cryptographic processing. Such processors generally include one or more hardware based encryption services that facilitate the encryption and decryption of classified files. For example, the hardware encryption services can include a hardware implemented cryptographic algorithm, a random number generator, and/or an exponentiator.

It should be understood that the method disclosed herein includes exclusively limiting concurrent access of the secure user processor to files defined within a single security classification level within the MLS file system. This process is accomplished by utilizing a client zeroizer that is responsive to the cryptographic processor to automatically zeroize at least one data store used by the secure user processor. According to one aspect of the invention, this zeroizing step is performed when the secure user processor transitions between a first state in which it has access to the multi-level secure file system at a first security classification level, and a second state in which it has access to the multi-level secure file system at a second security classification level. The method also includes communicating the classified information from the MLS file service module to the secure user processor over a secure path.

The method can also include receiving at an MLS file service module a request from the secure user processor for a non-encrypted unclassified file. In response to such request, the MLS file service module accesses the MLS file system containing the unclassified file. Thereafter, the cryptographic processor can verify the integrity of the unclassified file before the file is served to the secure user processor. If the unclassified file is an executable file, the method also includes selectively enabling a write function for program memory of the secure user processor responsive to the integrity checking step. This write function is disabled immediately after the unclassified executable file has been loaded into the program memory to guard against self modifying programs The method can further include selecting the cryptographic processor to include a trusted microprocessor and a trusted operating system executing on the trusted cryptographic processor. The secure user processor can also be chosen so as to include trusted microprocessor hardware. According to one aspect of the invention, the secure user processor is selected so as to include a single level trusted operating system. Alternatively, the secure user processor can be chosen so as to include an untrusted operating system.

The invention disclosed herein also includes a system for providing a secure file service. The basic building block of the system is an MLS file service module, which includes a cryptographic processor comprising suitable hardware and software for encrypting and decrypting a classified file. The MLS file service module also includes an MLS file system hosted by the cryptographic processor. The MLS file system contains classified files and is accessible exclusively to the cryptographic processor. The cryptographic processor is programmed so that it is responsive to a secure user processor distinct from the cryptographic processor. The cryptographic processor is provided with programming and data files as necessary for authenticating a user responsive to at least one user authentication information.

The secure user processor includes suitable programming and communications hardware for requesting at least one classified file from the MLS file service module that hosts the MLS file system. The cryptographic processor includes suitable cryptographic hardware and software to decrypt the classified file. The cryptographic processor is also programmed to perform an integrity check on the classified file. Once the file is decrypted and its integrity checked by the cryptographic processor, the MLS file service module serves the classified file to the secure user processor in decrypted form.

The cryptographic processor is programmed to serve the classified file to the secure user processor in decrypted form, but only if its integrity has been verified. The secure user processor has a program memory into which executable files are loaded. A write enable gate can be provided to limit write access to the program memory of the secure user processor. The cryptographic processor is programmed to selectively enable the write gate responsive to the integrity checking process of an executable file. The cryptographic processor is also programmed to disable this write function immediately after the classified executable file has been loaded into the program memory to guard against self modifying programs.

The cryptographic processor used in the system can exclusively limit the extent of MLS file access permitted to the secure user processor. In particular, the cryptographic processor has programming to limit the secure user processor so that it can concurrently access files that are only within a single security classification level within the multi-level secure file system. The system can accomplish this by means of a client zeroizer that is responsive to the cryptographic processor. The client zeroizer is configured for automatically zeroizing at least one data store used by the secure user processor.

According to one aspect of the invention, the cryptographic processor is programmed to cause the client zeroizer to automatically perform the zeroizing described herein under certain conditions. For example, the zeroizing can be performed when the secure user processor transitions between a first state in which the secure user processor has access to the multi-level secure file system at a first security classification level, and a second state in which the secure user processor has access to the multi-level secure file system at a second security classification level.

The system provides a secure path defining a data communication link between the secure user processor and the cryptographic processor. The system can also include a secure human/machine interface operatively connected to the secure user processor. The secure human/machine interface is configured for communicating user commands to the secure user processor.

The cryptographic processor can also include suitable programming and hardware so that it accesses the MLS file system responsive to a request from the secure user processor for an unclassified file. The MLS file service module can thereafter serve the unclassified file to the secure user processor.

According to one aspect of the invention, the cryptographic processor is comprised of a trusted microprocessor and a trusted operating system executing on the trusted cryptographic processor. The secure user processor can also be comprised of trusted microprocessor hardware. According to one embodiment, the secure user processor is comprised of a single level trusted operating system. Advantageously, however, the secure user processor can instead be comprised of an untrusted operating system.

DETAILED DESCRIPTION OF THE PREFERRED EMBODIMENTS

Figure 1:
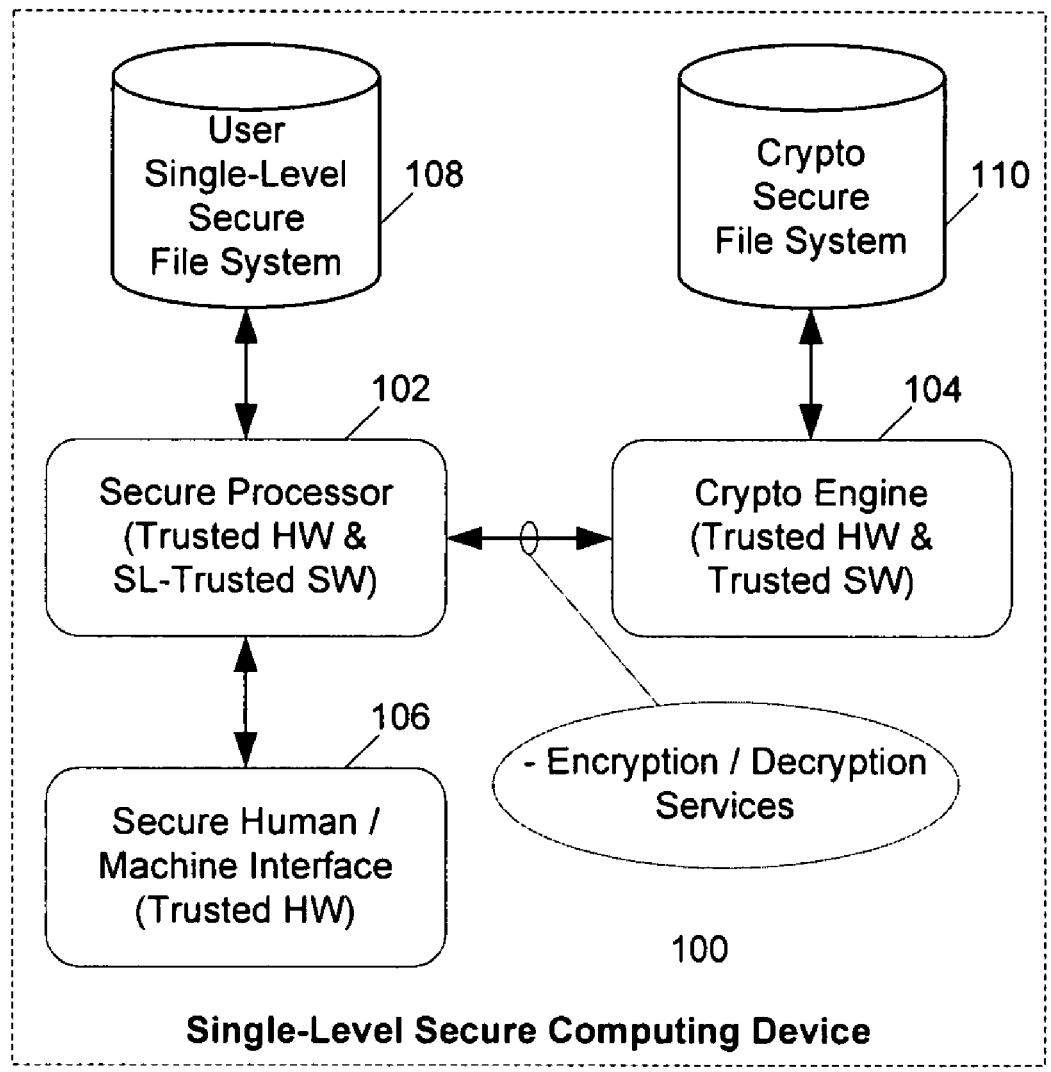
FIG. 1 is a block diagram of a single-level secure computing device of the prior art.

A block diagram of a single-level secure (SLS) computing device 100 is shown in FIG. 1. The SLS computing device 100 can include a secure user processor 102 that includes trusted hardware and single-level trusted software (operating system and application software). As used herein, the term "trusted" is used with reference to computer hardware, operating systems, and/or software applications that have been designed to ensure secure storage, processing and communication of data. Trusted hardware and trusted software can be combined to provide secure data processing. Trusted hardware and software are generally designed and tested to ensure the integrity and reliability of their source code, and their resistance to penetration. In contrast, non-trusted hardware and non-trusted software are generally not designed to an equally high level with regard to security precautions. Accordingly, when integrated into a computer system, those systems are often referred to as non-secure. Commercial-off-the-shelf (COTS) hardware and software is generally not "trusted."

The computing device 100 also includes a user SLS file system 108 in a data store that is used for storing user executable programs and data. Classified data stored in the SLS file system 108 is stored in an encrypted format. A cryptographic engine 104 is provided with trusted hardware and trusted software for providing encryption and decryption services. A crypto file system 110 is also maintained in a data store. The crypto file system 110 is used to store classified data and files used by the cryptographic engine 104. In contrast to the user SLS file system 108, user data and applications are not generally stored in the crypto file system 110. Instead, the crypto file system 110 generally contains cryptographic algorithms, security keys and certificates, audit data, policy profiles, and application data specific to the processing performed by the cryptographic engine 104.

A secure human/machine interface (HMI) 106 is also provided for the SLS computing device 100. The secure HMI 106 can be comprised of trusted hardware and can provide a trusted path to applications executing on secure user processor 102. Consequently, secure HMI 106 can prevent invasive or unauthorized applications from monitoring user inputs and system outputs. Secure HMI devices are known in the art and typically can include one or more features to ensure trusted communications between the user and the secure user processor. For example, the secure HMI 106 can provide a suitable interface by which a user can enter data and commands to the computing device 100. Secure HMI 106 can also include a user display for showing data and information processed by the computing device 100.

A user can request access to a classified data file using the secure HMI 106. Encrypted files in the user SLS files system 108 are accessed by the secure user processor 102 and provided to the cryptographic engine 104 for decryption. After the file has been decrypted, the cryptographic engine passes the decrypted file back to the secure user processor 102. Upon completion of any necessary user processing associated with the decrypted classified date file, the secure user processor 102 passes the file back to the cryptographic engine 104 for re-encryption. Thereafter, the encrypted file is returned to the secure user processor 102, which stores the file in the user SLS file system 108.

Notably, the secure user processor 102 can generally satisfy the security requirements for accessing the single-level secure file system 108. However, the operating system and applications can be expensive as compared to COTS systems. In particular, the secure user processor must be developed specifically to include trusted software for managing classified files, and especially for managing encryption and decryption services provided by the cryptographic processor. Another disadvantage of this arrangement is that the user single-level secure file system is not generally designed to physically secure the data and zeroize the data upon tamper detection.

Figure 2:
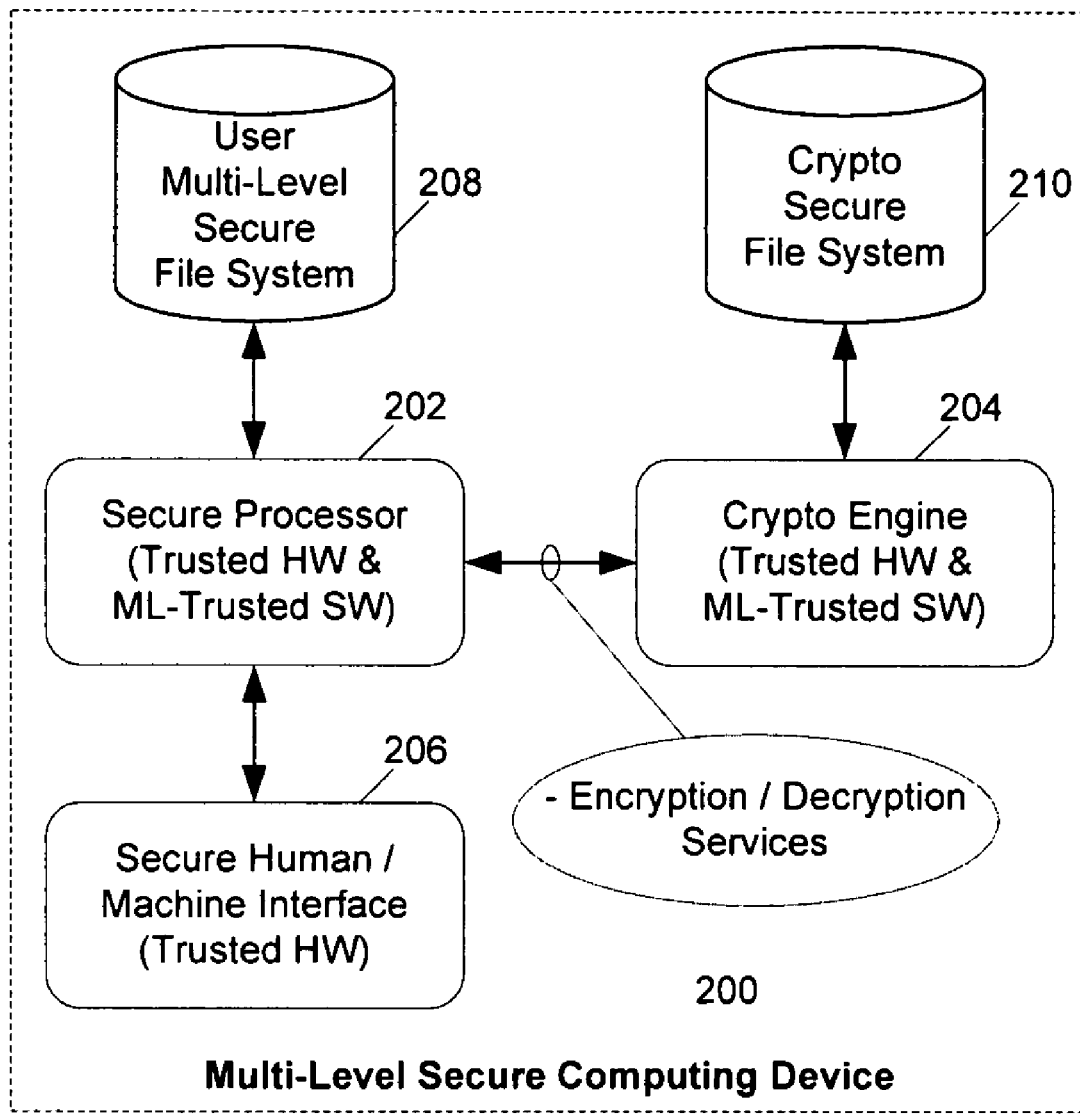
FIG. 2 is a block diagram of a multi-level secure computing device of the prior art.

Referring now to FIG. 2, there is shown a multi-level secure (MLS) computing device 200. MLS computing device 200 can include a secure user processor 202 comprised of trusted hardware and multi-level trusted software (operating system and application software). A secure human/machine interface (HMI) 206 is also provided for the MLS computing device 200. The secure human/machine interface can be similar to the secure HMI described above relative to FIG. 1

The MLS computing device 200 also includes a user MLS file system 208 in a data store that is used for storing user executable programs and data. Classified data stored in the MLS file system 208 is stored in an encrypted format. A cryptographic engine 204 is provided with trusted hardware and multi-level trusted software for providing encryption and decryption services. A crypto MLS file system 210 is used to store classified data and files used by the cryptographic engine 104. For example, the MLS file system can separately store and control access to data that is designated as Classified, Secret, or Top Secret. In contrast to the user MLS file system 208, user data and applications are not generally stored in the crypto MLS file system 210. Instead, the crypto MLS file system 210 generally contains cryptographic algorithms, security keys, and application data that is specific to the processing performed by the cryptographic engine 204.

Encrypted files in the user MLS files system 208 are accessed by the secure user processor 202 and provided to the cryptographic engine 204 for decryption. After the file has been decrypted, the cryptographic engine passes the decrypted file back to the secure user processor 202. Upon completion of any necessary user processing associated with the decrypted classified date file, the secure user processor 202 passes the file back to the cryptographic engine 204 for re-encryption. Thereafter, the encrypted file is returned to the secure user processor 202, which stores the file in the user MLS file system 208.

The secure user processor 202 can generally satisfy the security requirements for accessing the multi-level secure user file system 208. However, the operating system and applications can be expensive as compared to COTS systems. In particular, the secure user processor must be developed specifically to include trusted software for managing multiple levels of classified files, and especially for managing encryption and decryption services provided by the cryptographic processor. Another disadvantage of this arrangement is that the user multi-level secure user file system 208 is not generally designed to physically secure the data and zeroize the data upon tamper detection.

Figure 3:
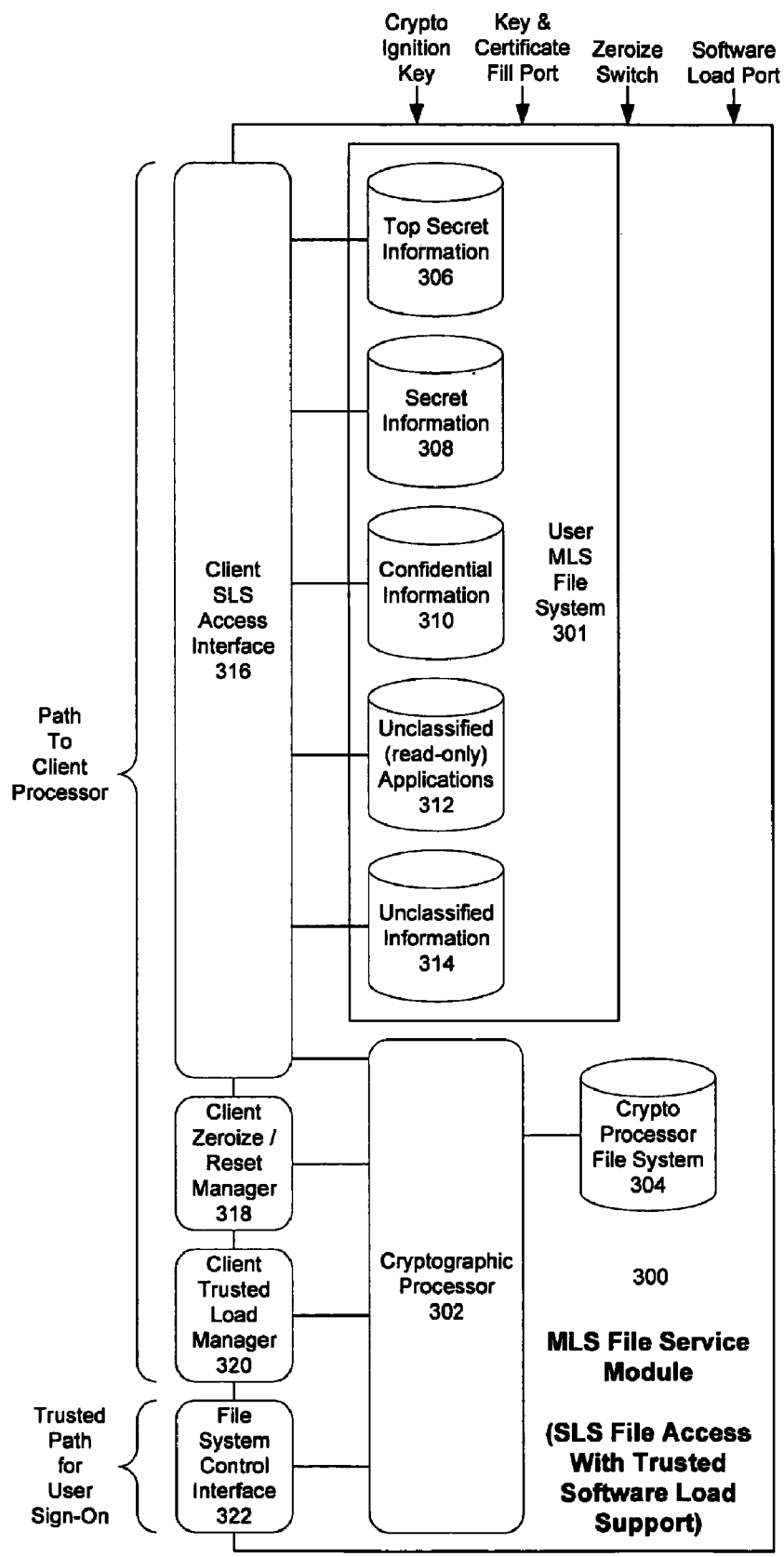
FIG. 3 is a detailed block diagram of a multi-level secure file service module configured for single-level secure file access and trusted software load support.

Referring now to FIG. 3, there is shown a detailed block diagram of an MLS file service module 300. The MLS file service module 300 is configured for providing SLS file access to a user MLS file system. As shown in FIG. 3 a cryptographic processor 302 can host a crypto processor file system 304. The crypto processor file system 304 can provide storage for various file used by the cryptographic processor 304. For example, these files can include cryptographic algorithms, keys and certificates, audit data, and policy profiles. The cryptographic processor 302 can also host a user MLS file system 301 comprised of classified information at multiple classification levels. More particularly, the cryptographic processor 302 can provide SLS file access to the MLS file system. Thus, the cryptographic processor 302 can serve files at a single defined security level to a client/user that has signed on at that particular security level after appropriate authentication. Additionally, the cryptographic processor 302 can be programmed to ensure that information loaded into the MLS file system has been provided by a trusted source and that the integrity of the information has been checked. For example, this can be accomplished using checksum/hashing technology.

A client SLS access interface 316 can provide communications support for a communication path between the MLS file service module 300 and a client processor. Any suitable physically-secure data communication path can be used for this purpose. Requests from a client processor for access to files and the decrypted data files can be communicated over this interface.

According to one embodiment of the invention, the user MLS file system 301 can include files comprising Top Secret information 306, Secret information 308, and Confidential information 310. The files comprising Top Secret information 306, Secret information 308, and Confidential information 310 are stored in an encrypted form. These files can include classified data and classified applications software. The classified information files stored in the user MLS file system 301 can be decrypted and integrity checked by the secure cryptographic processor 302 and then served to a client processor using client SLS access interface 316. In the opposite direction, classified information processed by the client processor is presented by means of client SLS access interface 316 to the cryptographic processor 302. The cryptographic processor 302 adds an integrity checksum, encrypts the classified data file and stores it in the classified section of the user MLS file system 301 as Top Secret information 306, Secret information 308, or Confidential information 310. In this way, the MLS file service module with SLS access 300 can provide a client processor with integrity-checked unencrypted read/write access to such files at a single security classification level after user authentication.

The user MLS file system 301 can also be comprised of files that are unclassified applications 312. Such applications can be stored in a non-encrypted format. Since a user will not normally need to modify applications software, the cryptographic processor 302 can limit access by a client processor so that the client processor is permitted read only access to the files comprising unclassified applications 312. The files included in the unclassified applications 312 can be read by the secure cryptographic processor 302, integrity-checked and then served to the client processor through client SLS access interface 316.

The user MLS file system 301 can also contain files comprising unclassified information 314. The files comprising unclassified information 314 stored in the user MLS file system 301 can be read by the secure cryptographic processor 302, integrity checked and then served to the client processor by means of client SLS access interface 316. In the opposite direction, unclassified information processed by the client processor is presented through client MLS access interface 316 to the cryptographic processor 302 for the addition of an integrity checksum and finally for storage in the unclassified section 316 of the user MLS file system. The MLS file service module with SLS access 300 can provide integrity-checked read/write access to files comprising unclassified information 314.

The MLS file service module includes a file system control interface 322. The file system control interface can provide a path for trusted user sign-on and authentication for user access to the SLS file access provided by MLS file service module 300. The file system control interface can be implemented in hardware, in software, or as a combination of hardware and software. Trusted paths for user sign-on and authentication as referenced herein are known in the art.

The MLS file service module 300 also includes client zeroize/reset manager 318. The client zeroize/reset manager 318 can be implemented in hardware, in software, or as a combination of hardware and software. The client zeroize/reset manager 318 can be controlled by cryptographic processor 302. The cryptographic processor can be programmed to cause the client zeroize/reset manager 318 to automatically zeroize and/or reset any data stores associated with the client processor served by the MLS file service module 300. The client zeroize/reset manager can zeroize or reset any memory devices or data stores used by the client processor to temporarily store application code, user data, or other file data served to the client processor by the MLS file service module 300. As will be appreciated by those skilled in the art, such memory devices can include RAM, DRAM, flash memory, video display buffers and any other memory devices used by the client processor for temporarily storing data from files served by the MLS file service module 300. This automatic process can occur each time that a client processor is transitioned from accessing files at one security classification level to another security classification level.

For example, an SLS client processor served by the MLS file service module 300 can be provided with SLS file access to Top Secret Information 306. Such access can occur after user sign-on and authentication as appropriate for that security level. Thereafter, a user wishing to use the same SLS client processor to access files at a different defined security classification level can log off the MLS file service module 300. Once logged off, the user can log back on to the MLS file service module 300 with the client processor at a different single defined security classification level. For example, after logging off from the Top Secret level, the client processor can subsequently be permitted access to files comprising a single security classification level such as Secret Information 308, Confidential Information 310, or Unclassified Information 314.

Those skilled in the art will appreciate that a client SLS processor of the prior art is normally only able to access classified information at one level. Such SLS processors and their associated software are not designed to accommodate the security demands for handling files at multiple security classification levels. In contrast, the present invention permits an SLS client processor served by the MLS file service module 300 to access information at multiple levels of security classification without the possibility of access violation. An example of such an access violations might include a user attempting to downgrade the security level of information contained in files. In particular, a user who accessed files using the client processor and defined as Top Secret Information 306 could maliciously or unintentionally subsequently try to store such data as Classified Information 310. Alternatively, such a situation could arise if information from files defined as Classified Information 310 were written unencrypted to the Unclassified Information 314 storage area. SLS processors are not generally designed to address these issues. However, this problem is solved by using the MLS file service module 300 described herein to provide SLS file access.

MLS file service module 300 also includes a client trusted load support manager 320. The client trusted load support manager 320 can be implemented in hardware, in software or as a combination of hardware and software. The client trusted load support manager 320 is controlled by cryptographic processor 302 to authenticate and then selectively control loading of application software into program memory of a secure user processor. Application software for the secure user processor can be stored in the user MLS file system 301. For example, such application software can comprise Top Secret Information 306, Secret Information 308, Confidential Information 310, or unclassified applications 312.

When a software application is first stored in the user MLS file system 301, the file can be source authenticated by the cryptographic processor. A variety of well known techniques can be used for this purpose. For example, conventional public key infrastructure (PKI) technology can be used for this purpose. With PKI based techniques, a software source may digitally sign a software application using its private key. The cryptographic processor 302 can verify that signature using a public key issued by a certificate authority within the PKI. This enables the cryptographic processor to verify that the software is authentic.

Subsequently, the MLS file service module 300 can receive from a secure user processor a request for a classified file. In response, the cryptographic processor 302 can access the file, and perform any decryption functions that may be required. Then, before serving the file to the secure user processor, the cryptographic processor can perform an integrity check on the file. According to an embodiment of the invention, this integrity checking can be accomplished using checksum/hashing technology.

The checksum process can protect the integrity of application software by detecting changes relative to an authenticated version of the software. The process involves adding up some value derived from the basic components of the file. The cryptographic processor 302 can be provided with this information in advance from a trusted source. Subsequently, the cryptographic processor 302 can perform the same operation on the file which is to be loaded into the secure user processor. In this way, the cryptographic processor can compare the software to be loaded to an authenticated version of the original software. If the checksum values match, the cryptographic processor can conclude that the software has not been corrupted or otherwise modified in some malicious way.

This integrity check can ensure that the file has not been corrupted in any way. If the file is determined to not to be corrupted, then the file will be served to the secure user processor and loaded into either data or program memory. Alternatively, if the integrity check reveals that the file has been corrupted, then the file will not be served by the MLS file service module to the secure user processor.

In FIG. 3, the cryptographic processor 302 can be one of several commercially available cryptographic engines. According to one embodiment, the cryptographic processor can be a Sierra II Crypto processor available from Harris Corporation of Melbourne, Fla. The cryptographic processor 302 can include configurable key lengths and can be programmed with one or more encryption algorithms. As illustrated in FIG. 3, the MLS file service module 300 can include several control and data ports that are useful for controlling the operation of the cryptographic processor 302. For example, these can include a crypto ignition key port, a key and certificate fill port, a zeroize switch, and a software load port. The software load port can be used for loading software from a trusted source for executing on the cryptographic processor 302 or a client processor. The zeroize switch can be used to clear the encryption keys and/or the classified information contained in the user MLS file system 301 and the crypto MLS file system 304. The various control and data ports can be controlled by the client processor or by any other suitable means.

The cryptographic processor 302 can include one or more security features. For example, in addition to controlling SLS access to an MLS file system, the cryptographic engine 302 can provide security auditing, security policy enforcement, file integrity checking and/or trusted boot software loading.

Figure 4:
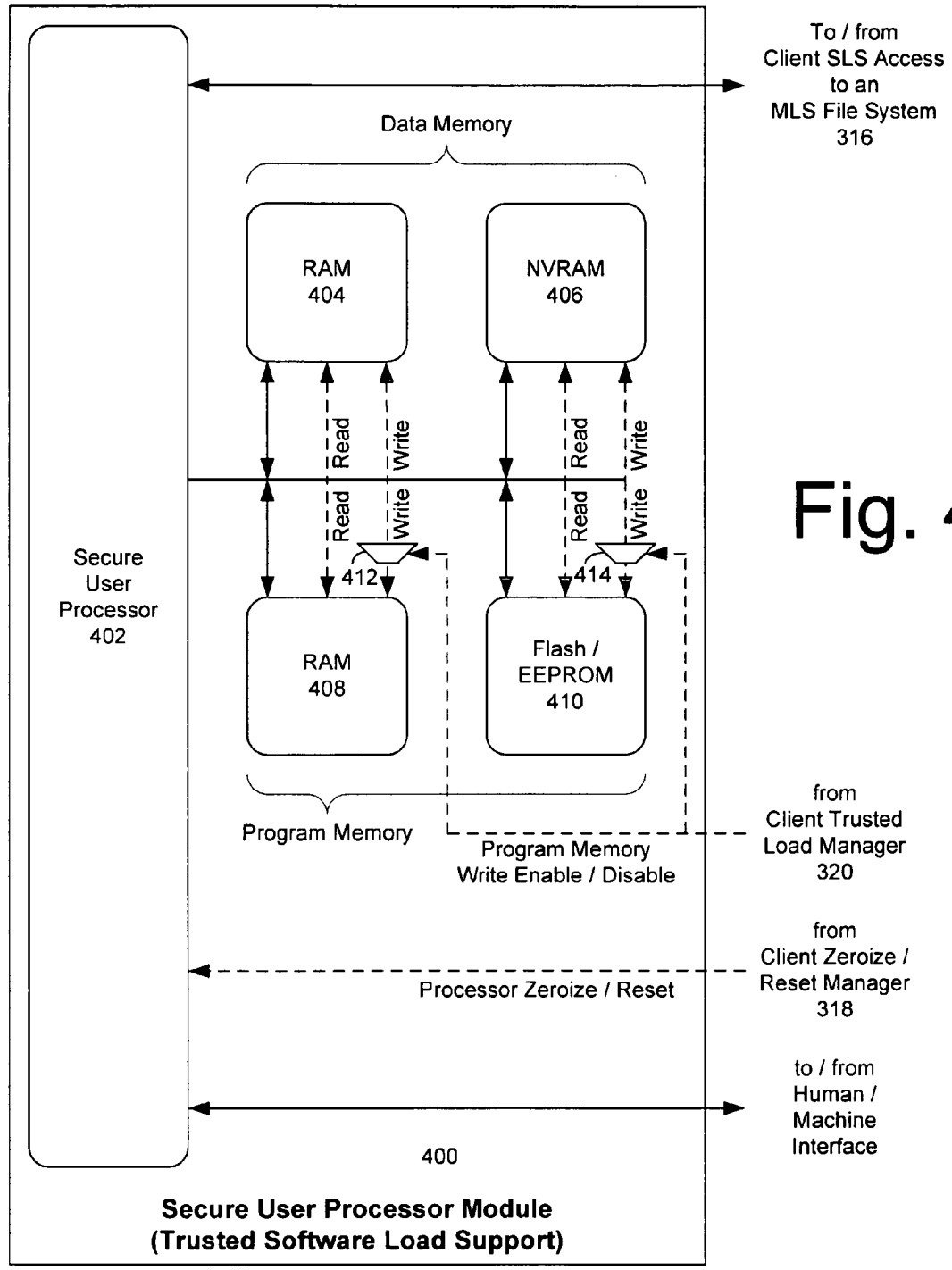
FIG. 4 is a block diagram of a secure user processor configured for trusted software load support.

Referring now to FIG. 4, there is shown a block diagram of a secure user processor module 400 that can be used in conjunction with the MLS file service module 300 in FIG. 3. Secure user processor module 400 includes a secure user processor 402 comprised of trusted processing hardware. According to one embodiment, the secure user processor 402 can include single level (SL) trusted software. Such SL trusted software can include a SL trusted operating system and SL trusted application software. According to another embodiment, the secure user processor 402 can include non-trusted software. Such non-trusted software can include a non-trusted operating system and one or more non-trusted application programs. The significance of these two different embodiments will be discussed in greater detail in relation to FIGS. 5 and 6.

As shown in FIG. 4, the secure user processor 402 includes a data communication link with the MLS file service module 300. This data communication link provides the secure user processor with SLS access to the user MLS file system 301 through the client SLS access interface 316, as described above. The secure user processor module 400 also includes suitable data store facilities. These data store facilities can be used for temporarily storing any necessary data or software applications used by the secure user processor 402. Such data store facilities can include data memory and program memory. The data memory can include RAM 404 and non-volatile RAM (NVRAM) 406. The program memory can include RAM 408 and Flash/EEPROM 410.

FIG. 4 also shows a control signal path from client zeroize/reset manager 318 to the secure user processor 402. The control signal path can be implemented in hardware, in software, or in a combination of hardware and software. One or more data stores associated with the secure user processor can zeroized in response to a control signal received by means of this control signal path. For example, such data stores can include data memory comprising RAM 404 and NVRAM 406. Such data stores can also include program memory comprised of RAM 408 and flash/EEPROM 410. Other data stores can also be zeroized in response to the control signal from the client zeroize/reset manager 318. For example, such data stores can include a video buffer memory (not shown).

The secure user processor module 400 also includes write enable gates 412 and 414 that selectively control write access to program memory including RAM 408 and Flash/EEPROM 410, respectively. A control signal from the client trusted load manager 320 can be used to selectively control the write enable gates 412, 414. The write enable gates 412, 414 can be used in conjunction with the client trusted load manager 320. This arrangement can allow the MLS file service module to ensure that write access to program memory (RAM 408, Flash/EEPROM 410) is provided only after the software has been authenticated and integrity checked by the cryptographic processor 302 utilizing appropriate means. Moreover, client trusted load manager 320 can thereafter disable write access to the program memory of secure user processor 402. By disabling the write access immediately after the application program has been loaded into memory, the client trusted load manager can protect the secure user processor against viruses and other types of self-modifying application software.

Figure 5:
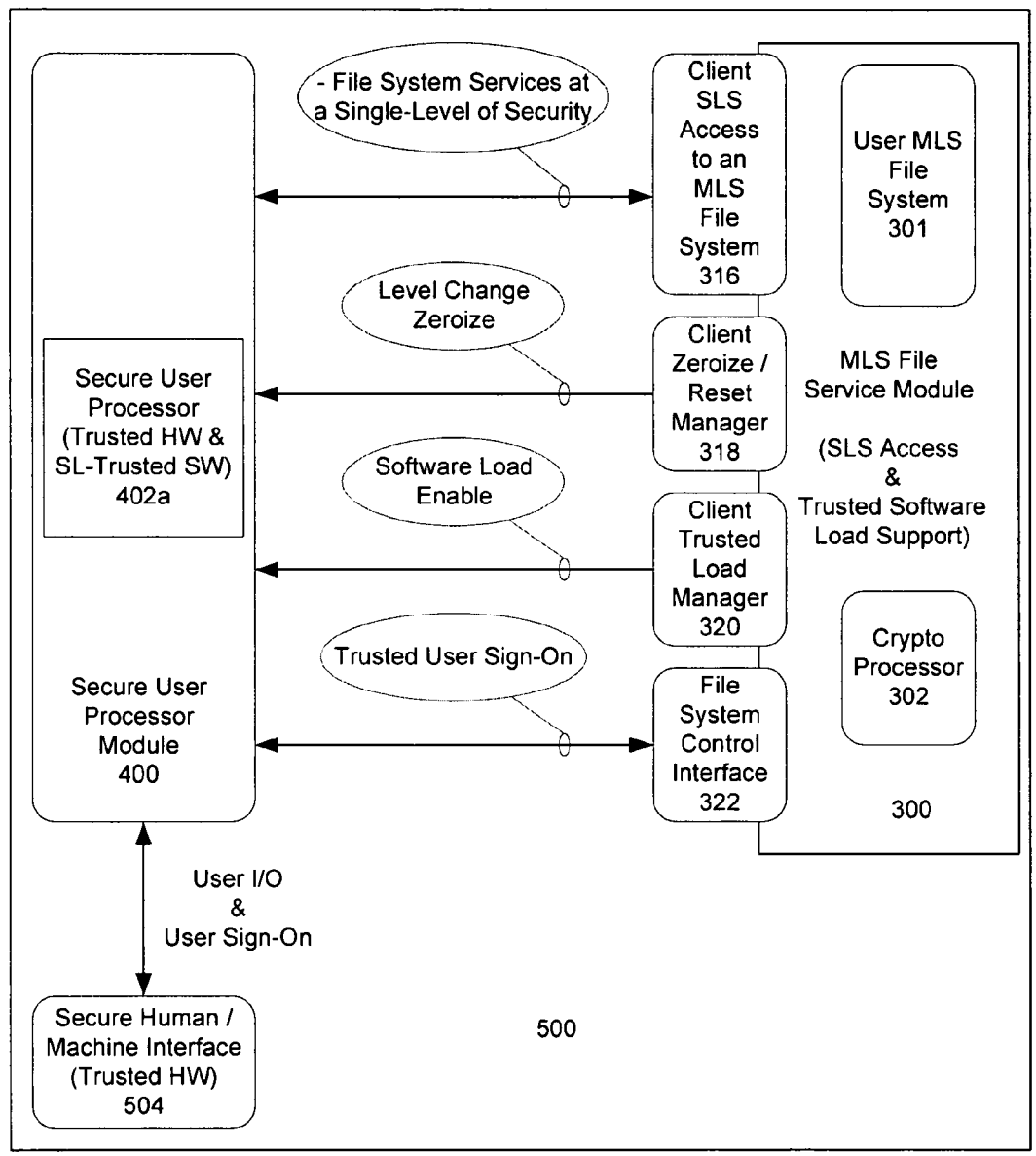
FIG. 5 is a block diagram of a multi-level secure computing architecture that utilizes the multi-level secure file service module of FIG. 3 and the secure user processor of FIG. 4.

Referring now to FIG. 5, there is shown a block diagram of a first embodiment of a multi-level secure (MLS) computing architecture 500 that is comprised of MLS file service module 300 and secure user processor module 400. In FIG. 5, the secure user processor module 400 includes a secure user processor 402a according to a first embodiment as described above. In particular, the secure user processor 402a utilizes trusted hardware and SL-trusted software (operating system and application software).

The MLS computing architecture 500 also includes a secure HMI 504. Secure HMI devices are known in the art and typically can include one or more features to ensure trusted communications between the user and the secure user processor. The secure HMI 504 is comprised of trusted hardware. Secure HMI 504 interfaces with the secure user processor 402a by means of a trusted communication link. Any suitable physically-secure data communication path can be used for this purpose, provided that it offers trusted communications between the secure user processor 402a and the secure HMI 504. This trusted communication link can be used for communicating user commands, data, and any information to be displayed on the secure HMI. It can also be used to facilitate user sign-on as hereinafter described. Trusted communication links as described herein are known in the art.

The MLS computing architecture in FIG. 5 provides SLS file service to an MLS file system, and trusted software loading. The architecture in FIG. 5 provides additional capabilities as compared to the prior art SLS computing device 100 shown in FIG. 1, thereby overcoming several of its limitations. The single-level trusted software running on secure user processor 402a is much simpler and thus less expensive to design, develop, and test/certify as compared to the SL-trusted software required for the secure user processor 102 in computing device 100. The SL-trusted operating system utilized on secure user processor 402a does not need to implement a trusted file system which is normally a significant portion of the SL-trusted OS development effort. The SL-trusted software applications utilized on secure user processor 402a do not need to invoke decryption services upon file read from the file system and do not need to invoke encryption services upon file write to the file system. The absence of these requirements significantly reduces the design, development and testing/certification effort for those software applications.

In addition to the foregoing advantages, the secure user processor 402a can now be used to access files at multiple security classification levels. Such SLS access to the user MLS file system 301 is advantageously achieved by placing responsibility for MLS security with the MLS file service module 300, and more particularly, with the cryptographic processor 302. Cryptographic processor 302 selectively controls the client zeroize/reset manager 318 to ensure that MLS file system data is zeroized in the data memory and program memory contained in secure user processor module 400. The cryptographic processor 302 is programmed so that this zeroizing process occurs whenever the secure user processor 402a transitions between accessing files at one security classification level versus files at another security classification level. This is a significant improvement over the capabilities and design efficiencies offered by existing architectures.

Yet another advantage of the MLS computing architecture in FIG. 5 is its ability to ensure trusted software loading for the secure user processor module 400. The MLS file service module 300, and more particularly, the cryptographic processor 302 can ensure trusted file loading by integrity checking any software applications before they are loaded into the program memory of the secure user processor 402a. Such integrity checking can be accomplished by using suitable means such as checksum/hashing techniques as previously described.

It is noted that although the software executing on secure user processor 402a is simpler and potentially less expensive than the software utilized by the secure user processor 102 in the prior art, the software executing on secure user processor 402a still needs to be designed, developed, and tested/certified to single-level secure standards. The software on secure user processor 402a still needs to be SL-trusted so that it can provide the trusted path to the file system control interface 322 to support trusted user sign-on services.

Figure 6:
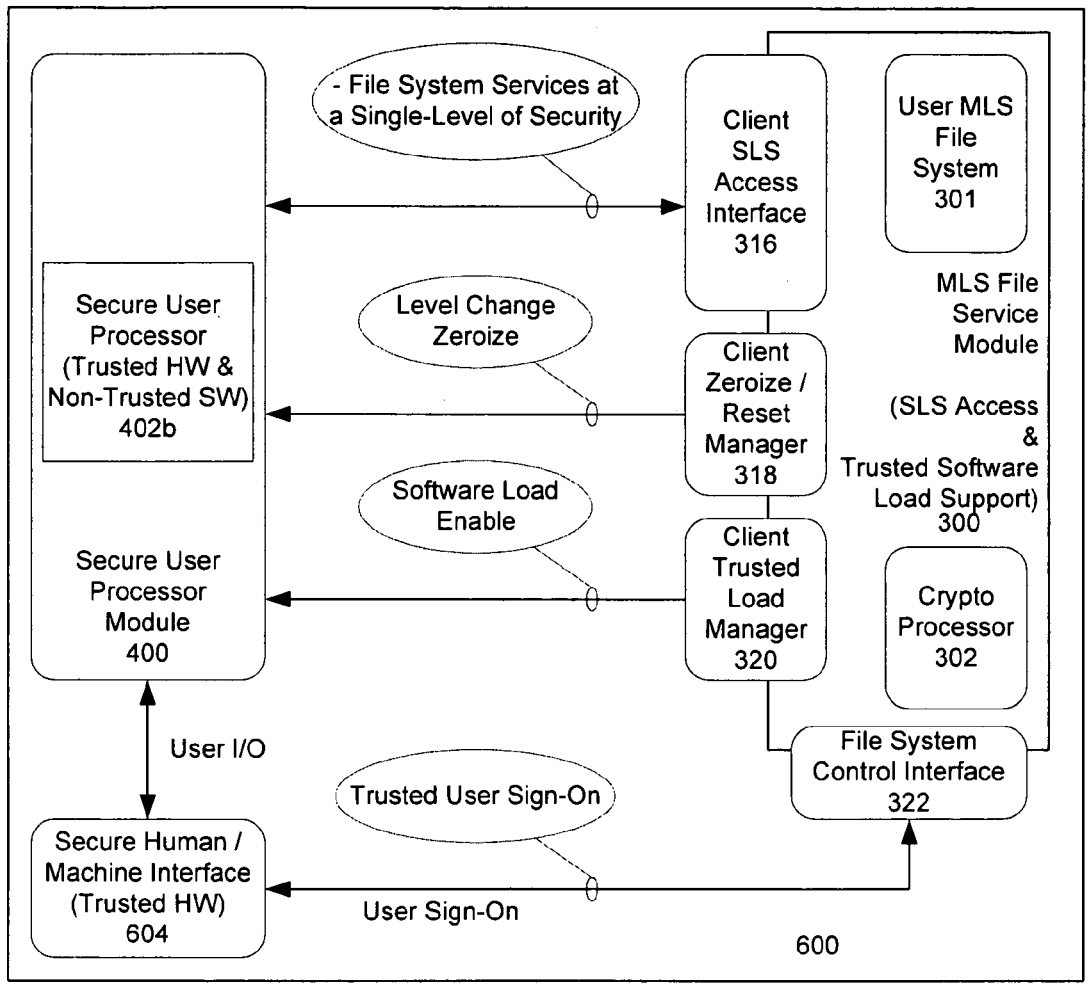
FIG. 6 is an alternative embodiment of a multi-level secure computing architecture that utilizes the multi-level secure file service module of FIG. 3 and the secure user processor of FIG. 4.

Referring now to FIG. 6, there is shown a block diagram for another embodiment of a computer architecture for an MLS computing device 600. The MLS computing device 600 is similar to the MLS computing device 500 to the extent that it is also comprised of MLS file service module 300 and secure user processor module 400. However, in FIG. 6 the secure user processor module 400 includes a secure user processor 402b according to a second embodiment as described above. The secure user processor 402b utilizes trusted hardware similar to the secure user processor 402a. However, rather than using SL-trusted software, the secure user processor 402 uses non-trusted software (operating system and application software). For example, COTS software, which is inexpensive and readily available, can be used for this purpose.

A secure HMI 604 is also provided. The secure HMI 604 is comprised of trusted hardware. Secure HMI 604 interfaces with the secure user processor module 400 by means of a physically-secure communication link. Any suitable physically-secure data communication path can be used for this purpose. This physically-secure data communication link can be used for communicating user commands, data, and any information to be displayed on the secure HMI. Notably, in the architecture shown in FIG. 6, this physically-secure communication link is not used to facilitate user sign-on because the software utilized by secure user processor module 400 is not trusted. Instead, a separate trusted communication link is provided directly between the secure HMI 604 and the file system control interface 322.

The secure user processor 402b also communicates with the MLS file service module 300. In particular, the secure user processor 402b can communicate with the client SLS access interface 316 (but not the file system control interface 322). The client SLS access interface 316 provides services as described above.

The architecture in FIG. 6 provides the same capabilities as the SLS computing device 500 shown in FIG. 5, while overcoming one of its major limitations. In contrast to the computing device 500, the software running on secure user processor 402b is COTS software that is highly familiar to the user and does not require expensive custom development. The tradeoff to this approach is that secure user processor 402b cannot provide the trusted path to the file system control interface 322 to support trusted user sign-on services. Referring to FIG. 6, it is seen that trusted human/machine interface 604 must now support two separate interfaces, one trusted file system control interface 322 to the file service module 300 to handle user authentication and a second physically-secure interface to secure user processor module 400 for all normal user input/output such as running software applications. This advantageous arrangement can permit a user to use familiar COTS operating systems and applications installed on the secure user processor 402b, while still having the benefit of access to classified files at multiple defined security levels in the MLS file service module 300.

In FIGS. 5 and 6 various communication links are provided respectively between the secure user processor module 400 and the MLS file service module 300. It should be understood that the foregoing communication links can be implemented by any suitable means and in different physical configurations, provided it is physically secure. For example, the data communication link can be through a direct connection (e.g.

USB, PCMCIA) interface. Such a direct connection can create the appearance that the MLS file service module 300 is a local disk drive. However, in order to establish a trusted path for user sign-on/sign-off, suitable trusted path methods can be used to provide the communication link. Trusted path methods of this type are well known to those skilled in the art.

As an alternative to the direct connection approach described above, the MLS file service module 300 can be embedded in the computer on an I/O bus (e.g. PCI) to provide the appearance of a local disk drive, but within the same physically secure enclosure. In this way, a secure path can be provided between the secure user processor and the file service module. Yet another alternative can include embedding the MLS file service module 300 on a host computer motherboard. Consequently, the data communication can occur over a data communication link within the same physically secure enclosure to establish a secure path.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A method for providing a single level secure user processor with multi-level secure file services, comprising:
   communicating a request for a classified executable file from said single level secure user processor to a multi-level secure (MLS) service module over a physically-secure data communication path;
   responsive to said request, accessing with a cryptographic processor of said MLS service module an MLS file system containing said classified executable file which is in an encrypted form;
   decrypting said classified executable file with said cryptographic processor;
   verifying, at said cryptographic processor, an integrity of said decrypted classified executable file;
   in response to said verification of said integrity of said decrypted classified executable file, selectively enabling with said MLS service module a write function for program memory of said single level secure user processor;
   communicating said decrypted classified executable file from said MLS service module to said single level secure user processor over said physically-secure data communication path; and
   disabling with said MLS service module said write function immediately after said decrypted classified executable file has been loaded into said program memory of said single level secure user processor.

2. The method according to claim 1, further comprising selecting said cryptographic processor to include one or more hardware based encryption services that facilitate the encryption and decryption of classified files.

3. The method according to claim 2, further comprising selecting said hardware based encryption services from the group consisting of a hardware implemented cryptographic algorithm, a random number generator, and an exponentiator.

4. The method according to claim 1, further comprising communicating classified files having different security classification levels from said MLS service module to said single level secure user processor, and using said MLS service module to exclusively limit concurrent access of said single level secure user processor to files defined within a single security classification level within said MLS file system.

5. The method according to claim 4, further comprising transitioning said single level secure user processor from accessing classified data files of a first security classification level to accessing data files of a second security classification level contained in said MLS file system; and
   in response to said transitioning of said single level secure user processor, automatically zeroizing at least one data store used by said single level secure user processor to temporarily store said classified data files served to said single level secure user processor by said MLS service module.

6. The method according to claim 1, further comprising communicating said decrypted classified executable file from said MLS file service module to said single level secure user processor over a secure path.

7. The method according to claim 1, further comprising generating said request for said decrypted classified executable file from said MLS file service module to said single level secure user processor over a secure path.

8. The method according to claim 1, further comprising authenticating a user to said cryptographic processor by communicating at least one user authentication information to said cryptographic processor.

9. The method according to claim 1, further comprising:
   receiving at said MLS file service module a request from said single level secure user processor for a non-encrypted unclassified file;
   responsive to said request, accessing said unclassified file with said MLS file system;
   verifying an integrity of said unclassified file; and
   serving said unclassified file to said single level secure user processor.

10. The method according to claim 9, further comprising selectively enabling with said MLS service module said write function for program memory of said single level secure user processor responsive to said verification of said integrity of said unclassified file.

11. The method according to claim 9, further comprising disabling with said MLS service module said write function immediately after said unclassified file has been loaded into said program memory, said unclassified file being an executable file.

12. The method according to claim 1, further comprising selecting said cryptographic processor to include a trusted microprocessor and a trusted operating system executing on said trusted cryptographic processor.

13. The method according to claim 1, further comprising selecting said single level secure user processor to include a trusted microprocessor hardware.

14. The method according to claim 13, further comprising selecting said single level secure user processor to include a single level trusted operating system.

15. The method according to claim 13, further comprising selecting said single level secure user processor to include an untrusted operating system.

16. A system for providing a single level secure user processor with multi-level secure file services, comprising:
   a multi-level secure (MLS) service module including a cryptographic processor for encrypting and decrypting a classified file;
   a single level secure user processor communicatively coupled to said MLS service module by a physically-secure communication path;

an MLS file system included in said MLS service module and hosted by said cryptographic processor, said MLS file system containing classified files accessible exclusively to said cryptographic processor; and wherein said cryptographic processor is configured, in response to a request for a classified executable file received from said single level secure user processor, to access at least one classified executable file from said MLS file system, decrypt said classified executable file, verify an integrity of said decrypted classified executable file prior to serving said classified file to said single level secure user processor in decrypted form;

in response to said verification of said integrity of said decrypted classified executable file, selectively enable a write function for program memory of said single level secure user processor; and disable said write function immediately after said decrypted classified executable file has been loaded into said program memory of said single level secure user processor.

17. The system according to claim 16, wherein said cryptographic processor further comprises one or more hardware based encryption services that facilitate the encryption and decryption of classified files.

18. The system according to claim 17, wherein said hardware based encryption services are selected from the group consisting of a hardware implemented cryptographic algorithm, a random number generator, and an exponentiator.

19. The system according to claim 16, wherein said cryptographic processor is programmed to permit classified files having different security classification levels to be served to said single level secure user processor but exclusively limits said single level secure user processor to concurrently access only files defined within a single security classification level within said MLS file system.

20. The system according to claim 19, further comprising a client zeroizer responsive to said cryptographic processor, said client zeroizer configured for automatically zeroizing said data store used by said single level secure user processor.

21. The system according to claim 20, wherein said cryptographic processor is programmed to automatically cause said client zeroizer to perform said zeroizing of said data store, in response to a transition of said single level secure user processor from a first state in which said single level secure user processor has access to said MLS file system at a first security classification level, to a second state in which said single level secure user processor has access to said MLS file system at a second security classification level.

22. The system according to claim 16, further comprising a secure path defining a data communication link between said single level secure user processor and said cryptographic processor.

23. The system according to claim 16, further comprising a secure human/machine interface operatively connected to said single level secure user processor and configured for communicating user commands to said single level secure user processor.

24. The system according to claim 16, wherein at least one of said single level secure user processor and said cryptographic processor is further configured for authenticating a user responsive to at least one user authentication information.

25. The system according to claim 16, wherein said cryptographic processor is further configured for accessing said MLS file system responsive to a request from said single level secure user processor for an unclassified file, and serving said unclassified file to said single level secure user processor.

26. The system according to claim 16, wherein said cryptographic processor is comprised of a trusted microprocessor and a trusted operating system executing on said trusted cryptographic processor.

27. The system according to claim 16, wherein said single level secure user processor includes a trusted microprocessor hardware.

28. The system according to claim 27, wherein said single level secure user processor is comprised of a single level trusted operating system.

29. The system according to claim 27, wherein said single level secure user processor comprises an untrusted operating system.

* * * * *